United States Patent
Datta et al.

(10) Patent No.: US 10,447,704 B2
(45) Date of Patent: Oct. 15, 2019

(54) AUTOMATIC HOLDING OF TRANSMISSIONS UNTIL VERIFICATION COMPLETE

(71) Applicant: Microsoft Technology Licensing, LLC, Redmond, WA (US)

(72) Inventors: Ajay Datta, Bangalore (IN); Shrinivas Rameshrao Devshatwar, Bangalore (IN); Neena Teresa Jose, Kerala (IN); Gaurav Gupta, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 15/793,131

(22) Filed: Oct. 25, 2017

(65) Prior Publication Data

US 2019/0124088 A1    Apr. 25, 2019

(51) Int. Cl.
*H04L 29/06* (2006.01)
*H04L 29/08* (2006.01)
*H04L 12/58* (2006.01)
*H04W 4/12* (2009.01)

(52) U.S. Cl.
CPC ............ *H04L 63/102* (2013.01); *H04L 51/00* (2013.01); *H04L 63/083* (2013.01); *H04L 65/40* (2013.01); *H04L 67/12* (2013.01); *H04L 67/141* (2013.01); *H04L 67/306* (2013.01); *H04W 4/12* (2013.01)

(58) Field of Classification Search
CPC ... H04L 63/102; H04L 63/083; H04L 67/306; H04L 67/12; H04L 67/141; H04L 65/40
See application file for complete search history.

(56) References Cited

U.S. PATENT DOCUMENTS

| | | | |
|---|---|---|---|
| 7,669,225 B2* | 2/2010 | Peled | G06F 21/10 705/18 |
| 2010/0042680 A1* | 2/2010 | Czyzewicz | G06Q 10/10 709/203 |
| 2010/0169343 A1* | 7/2010 | Kenedy | G06F 16/285 707/758 |
| 2016/0012465 A1* | 1/2016 | Sharp | G06Q 20/18 705/14.17 |
| 2017/0337164 A1* | 11/2017 | Longdale | H04L 51/18 |

* cited by examiner

*Primary Examiner* — El Hadji M Sall
(74) *Attorney, Agent, or Firm* — Schwegman Lundberg & Woessner, P.A.

(57) ABSTRACT

Techniques for ensuring verification before transmission of electronic messages are disclosed herein. In some embodiments, a computer-implemented method comprises: transmitting a confirmation request message to an e-mail address stored in a database of an online service in association with a digital representation of a first user of the online service; subsequent to transmitting the confirmation request message, causing a selectable option to send a user-to-user message to a second user via the online service to be displayed on the computing device of the first user; receiving, from the computing device of the first user, a selection of the option to send the user-to-user message to the second user; determining that the confirmation of the e-mail address has not been received; and preventing a transmission of the user-to-user message to the second user based on the determining that the confirmation of the e-mail address has not been received.

20 Claims, 12 Drawing Sheets

| SENDER | RECIPIENT | MESSAGE TYPE | MESSAGE CONTENT |
|---|---|---|---|
| USER-1 | USER-2 | TYPE A | CONTENT A |
| USER-1 | USER-3 | TYPE A | CONTENT A |
| USER-1 | USER-5 | TYPE A | CONTENT A |
| USER 1 | USER-6 | TYPE B | CONTENT B |
| ... | ... | ... | ... |

700

*FIG. 7*

AUTOMATIC HOLDING OF TRANSMISSIONS UNTIL VERIFICATION COMPLETE

TECHNICAL FIELD

The present application relates generally to the transmission of electronic messages and, in one specific example, to methods and systems of ensuring verification before transmission of electronic messages.

BACKGROUND

For certain online services, users must pass through a verification process before being able to use certain functions of the online service, such as sending messages to other users via the online service. The verification process impedes the online service from providing these functions to its users, thereby causing the online service to sacrifice functionality of technical features for improved computer system security.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 7 illustrates a table of indications of selections, by a user, of an option to send a user-to-user message to other users, in accordance with an example embodiment.

DETAILED DESCRIPTION

Figure 1:
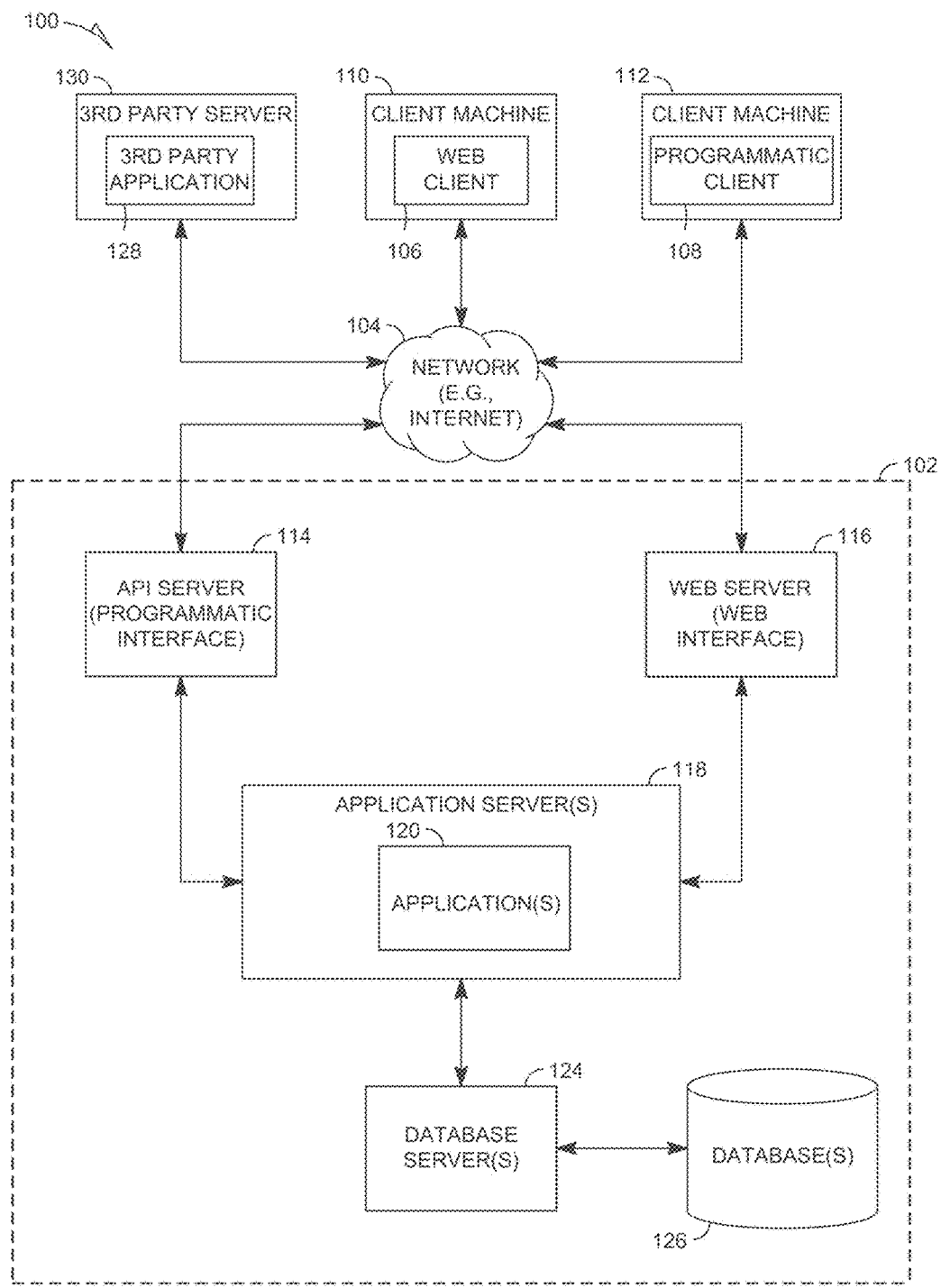
FIG. 1 is a block diagram illustrating a client-server system, in accordance with an example embodiment.

Example methods and systems of ensuring verification before transmission of electronic messages are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to enable a computer system to provide functions of an online service to a user before the user has completed a verification process, while at the same time ensuring security of the computer system. For example, the system and method of the present disclosure may provide a user with a selectable option of using a function of the online service before the user has completed the verification process, and then store an indication of the user's selection of the option to use the function, until the user has completed the verification process, at which time the function is then performed. As a result, the user is provided with part of the function of the online service, while the rest of the function of the online service is delayed until the verification process is completed. Additionally, other technical effects will be apparent from this disclosure as well.

In some example embodiments, operations are performed by a computer system (or other machine) having a memory and at least one hardware processor, with the operations comprising: receiving, from a computing device of a first user, a request to generate a digital representation of the first user's identity on an online service; generating the digital representation of the first user's identity based on the request to generate the digital representation; storing the digital representation on a database of the online service; transmitting a confirmation request message to an e-mail address stored in association with the digital representation of the first user, the confirmation request message comprising a request for the first user to confirm the e-mail address; subsequent to transmitting the confirmation request message, causing a selectable option to send a user-to-user message (e.g., a message that is requested by one user to another user) to a second user via the online service to be displayed on the computing device of the first user before receiving a confirmation of the e-mail address from the first user; receiving, from the computing device of the first user, a selection of the option to send the user-to-user message to the second user; determining that the confirmation of the e-mail address has not been received; and preventing a transmission of the user-to-user message to the second user based on the determining that the confirmation of the e-mail address has not been received. In some example embodiments, the preventing comprises storing an indication of the selection of the option to send the user-to-user message to the second user in a data storage device.

In some example embodiments, a digital representation of a user's identify comprises a profile of the user. The profile of the user may comprise profile data, which may be stored in one or more databases of an online service, as will be discussed in further detail below.

In some example embodiments, the user-to-user message to the second user comprises an invitation to connect with the first user via the online service. In some example embodiments, the online service comprises a social networking service. In some example embodiments, the indication that is stored in the data storage comprises an identification of the second user.

In some example embodiments, the operations further comprise receiving the confirmation of the e-mail address from the first user. In some example embodiments, the operations further comprise transmitting the user-to-user message to the second user via the online service based on the receiving the confirmation of the e-mail address. In some example embodiments, the transmitting the user-to-user message to the second user comprises: accessing the indication stored in the data storage device; and generating the user-to-user message based on the accessed indication. In some example embodiments, the transmitting of the user-to-user message to the second user via the online service is further based on the confirmation of the e-mail address being received within a predetermined time period. In some example embodiments, the predetermined time period comprises a predetermined amount of time after receiving the selection of the option to send the user-to-user message to the second user.

In some example embodiments, the operations further comprise: determining that a predetermined amount of time has passed; and deleting the indication from the data storage based on the determining that the predetermined amount of time has passed. In some example embodiments, the predetermined time period comprises a predetermined amount of time after receiving the selection of the option to send the user-to-user message to the second user.

In some example embodiments, the operations further comprise: receiving a request to reset a password stored in association with the digital representation; and deleting the indication from the data storage based on the receiving the request to reset the password.

In some example embodiments, the operations comprise: generating, for an online service, a digital representation of a first user's identity based on a request received from a computing device; transmitting a confirmation request message using contact information received from the computing device in association with creating the digital representation of the first user's identity, the confirmation request message requesting action to confirm information associated with creating the digital representation; causing a selectable option to send a user-to-user message to a second user via the online service to be displayed on the computing device before the requested action is performed; receiving, from the computing device, a selection of the option to send the user-to-user message to the second user; determining that the requested action has not been performed; preventing a transmission of the user-to-user message to the second user based on the determining that the requested action has not been performed; storing, in a data storage, an indication of the selection of the option to send the user-to-user message to the second user; and responsive to the requested action being performed, transmitting the user-to-user message to the second user based on the stored indication. In some example embodiments, the contact information comprises at least one of an e-mail address or a destination for receiving text messages (e.g., a cell phone number). In some example embodiments, the confirmation request message requests action to confirm that the first user requested creation of the representation of the first user's identify for the online service, or that the first user requested some other action of the online service.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will he appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 105 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
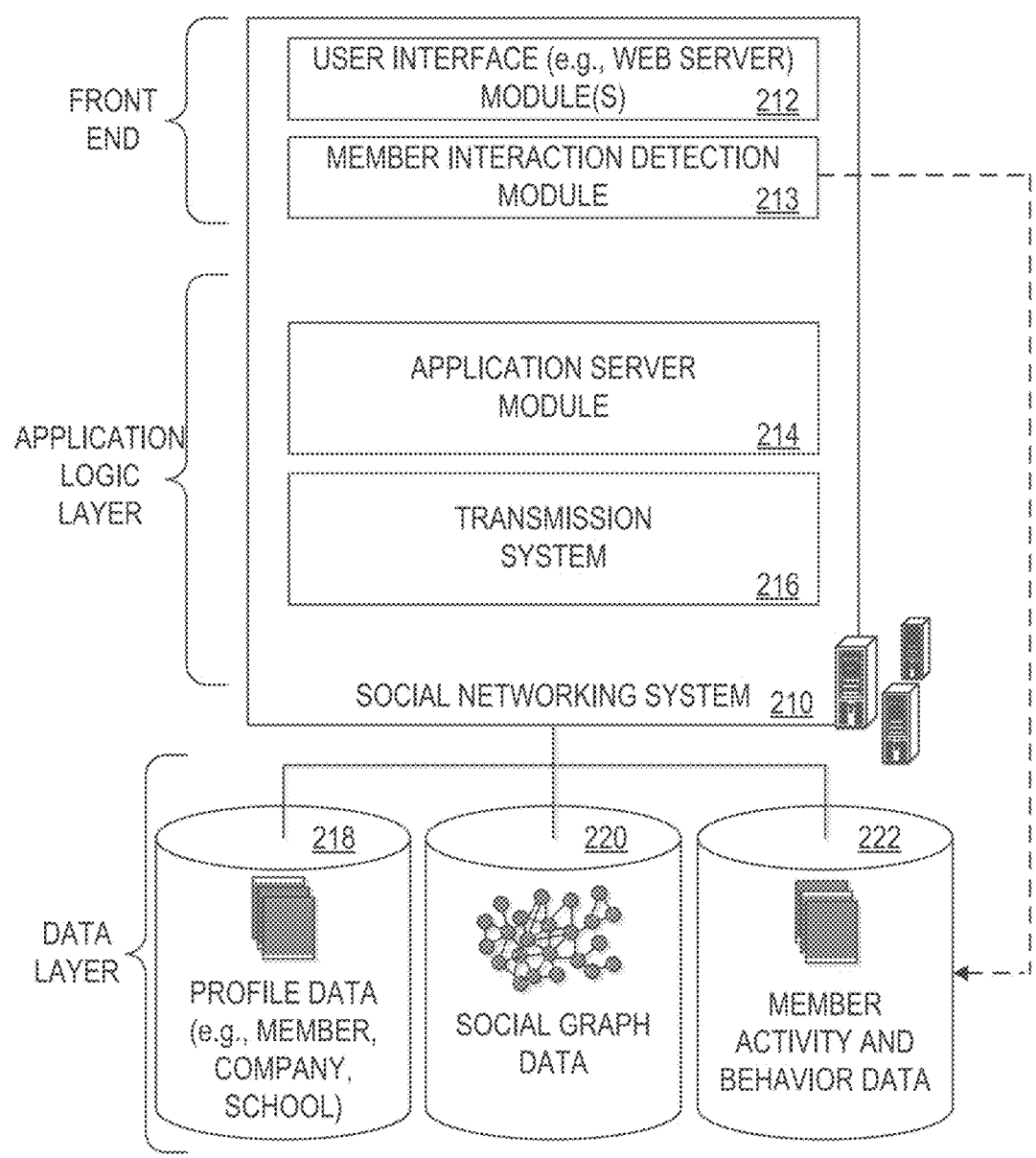
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a transmission system 216, for use in social networking system 210, consistent with some embodiments of the present disclosure. In some embodiments, the transmission system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the transmission system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative ma be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority, level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210 the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the transmission system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the transmission system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
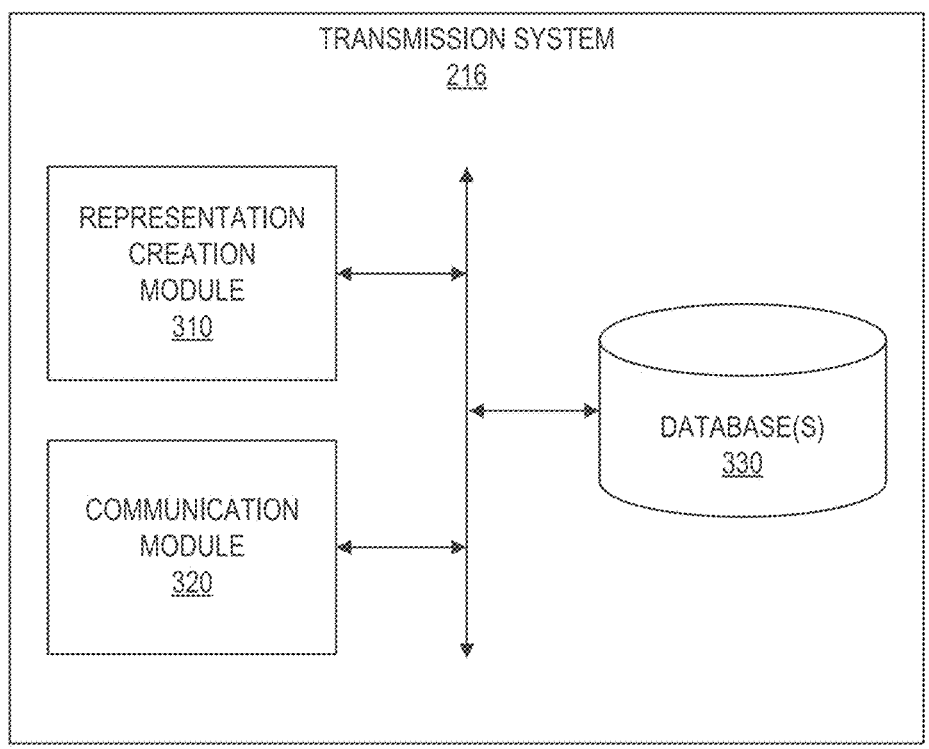
FIG. 3 is a block diagram illustrating components of a transmission system, in accordance with an example embodiment.

FIG. 3 is a block diagram illustrating components of the transmission system 216, in accordance with an example embodiment. In some embodiments, the transmission system 216 comprises any combination of one or more of a representation creation module 310, a communication module 320, and one or more database(s) 330. The modules 310 and 320 and the database(s) 330 can reside on a computer system, or other machine, having a memory and at least one processor (not shown). In some embodiments, the modules 310 and 320 and the database(s) 330 can be incorporated into the application server(s) 118 in FIG. 1. In some example embodiments, the database(s) 330 is incorporated into database(s) 126 in FIG. 1 and can include any combination of one or more of databases 218, 220, and 222 in FIG. 2. However, it is contemplated that other configurations of the modules 310 and 320, as well as the database(s) 330, are also within the scope of the present disclosure.

In some example embodiments, one or more of the modules 310 and 320 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310 and 320 is configured to receive user input. For example, one or more of the modules 310 and 320 can present one or more GUI elements (e.g., drop-down menu, selectable buttons, text field) with which a user can submit input.

In some example embodiments, one or more of the modules 310 and 320 is configured to perform various communication functions to facilitate the functionality described herein, such as by communicating with the social networking system 210 via the network 104 using a wired or wireless connection. Any combination of one or more of the modules 310 and 320 may also provide various web services or functions, such as retrieving information from the third party servers 130 and the social networking system 210. Information retrieved by the any of the modules 310 and 320 may include profile data corresponding to users and members of the social networking service of the social networking system 210.

Additionally, any combination of one or more of the modules 310 and 320 can provide various data functionality, such as exchanging information with database(s) 330 or servers. For example, any of the modules 310 and 320 can access member profiles that include profile data from the database(s) 330, as well as extract attributes and/or characteristics from the profile data of member profiles. Furthermore, the one or more of the modules 310 and 320 can access social graph data and member activity and behavior data from database(s) 330, as well as exchange information with third party servers 130, client machines 110, 112, and other sources of information.

In some example embodiments, the representation creation module 310 is configured to receive, from a computing device of a user, a request to generate a digital representation of the user's identity, such as a profile, on an online service. The representation creation module 310 may display a page or a series of pages (e.g., via a website or a mobile application) on the computing device of the user, which the user may use to submit the request to generate the digital representation to the representation creation module 310. For example, the representation creation module 310 may display a page requesting information for the user to submit in order to create a profile for the user on a social networking service, such as that of social networking system 210 of FIG. 2.

Figure 4:
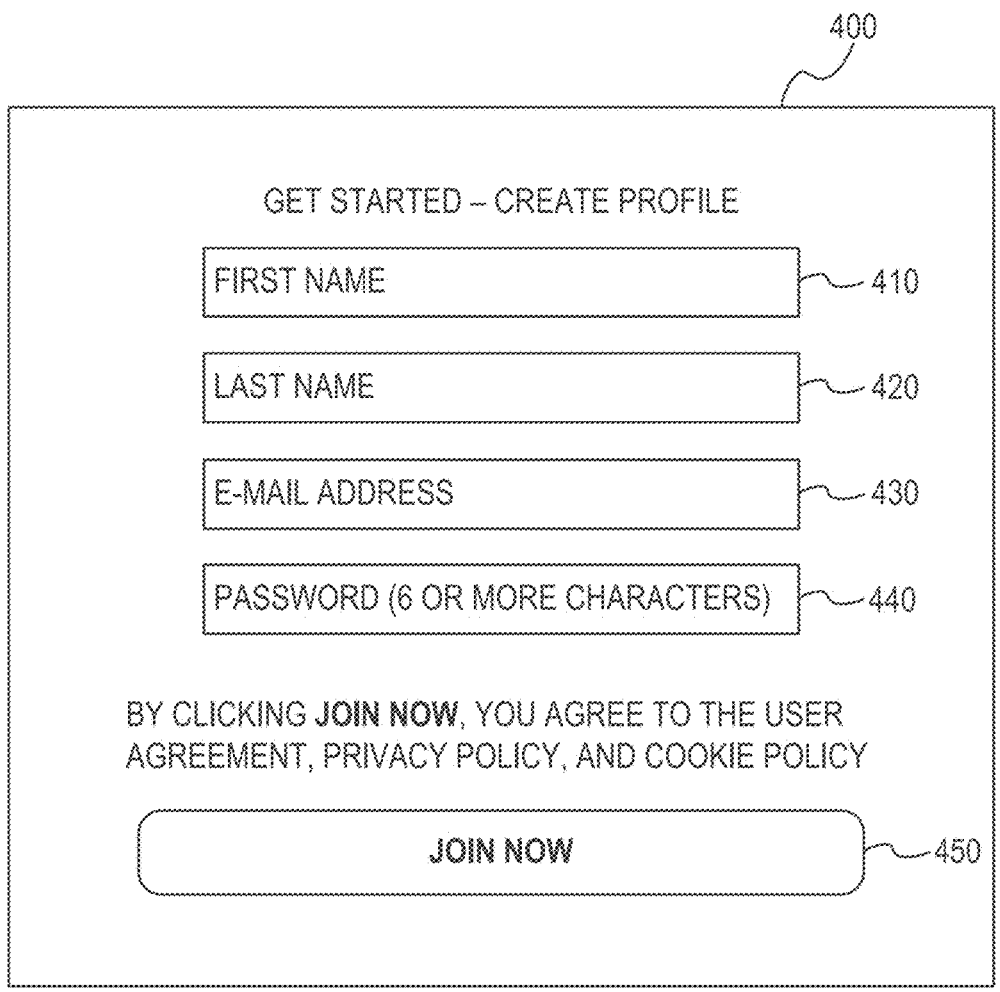
FIG. 4 illustrates a graphical user interface (GUI) in which a user can submit a request to generate a digital representation of the user's identity, in accordance with an example embodiment.

FIG. 4 illustrates a graphical user interface (GUI) 400 in which a user can submit a request to generate a digital representation of the user's identity, in accordance with an example embodiment. GUI 400 may comprise one or more user interface elements configured to enable the user to provide information for creating a profile on an online service. For example, in FIG. 4, GUI 400 comprises a text field 410 in which the user is to enter his or her first name, a text field 420 in which the user is to enter his or her last name, a text field 430 in which the user is to enter his or her e-mail address, and text field 440 in which the user is to enter a password for the digital representation (e.g., profile) that is to be created. In the example embodiments shown in FIG. 4, GUI 400 also comprises a selectable user interface element 450 (e.g., a selectable "JOIN NOW" button), which is configured to submit the information provided by the user in text fields, 410, 420, 430, and 440 for creation of the digital representation of the user on an online service in response to the selectable user interface element 450 being activated (e.g., clicked on, tapped on).

Referring back to FIG. 3, in some embodiments, the representation creation module 310 is configured to generate a digital representation of the user's identity based on the request to generate the digital representation, and to store the digital representation on one or more databases (e.g., database(s) 330) of the online service. For example, in response to receiving the request to generate the digital representation submitted by the user, the representation creation module 310 may create and store a record of a profile for the user in database 218 of FIG. 2, with the record comprising the profile data submitted with the request to generate the digital representation, as well as with other profile data that is provided by user either with the request or subsequent to the user submitting the request. Such other profile data may include but is not limited to age (e.g., birthdate), gender, interests, contact information, home town, address, the names of the member's spouse and/or family members, educational background (e.g., schools, majors, matriculation and/or graduation dates, etc.), employment history, skills, and professional organizations.

In some example embodiments, the communication module 320 is configured to perform a verification procedure to verify that the request to generate the digital representation is valid or legitimate, such as by transmitting a confirmation request message to an e-mail address stored in association with the digital representation of the user. The confirmation request message comprises a request for the user to confirm the e-mail address, and is configured to enable the user to submit a confirmation of the e-mail address to the communication module 320.

Figure 5:
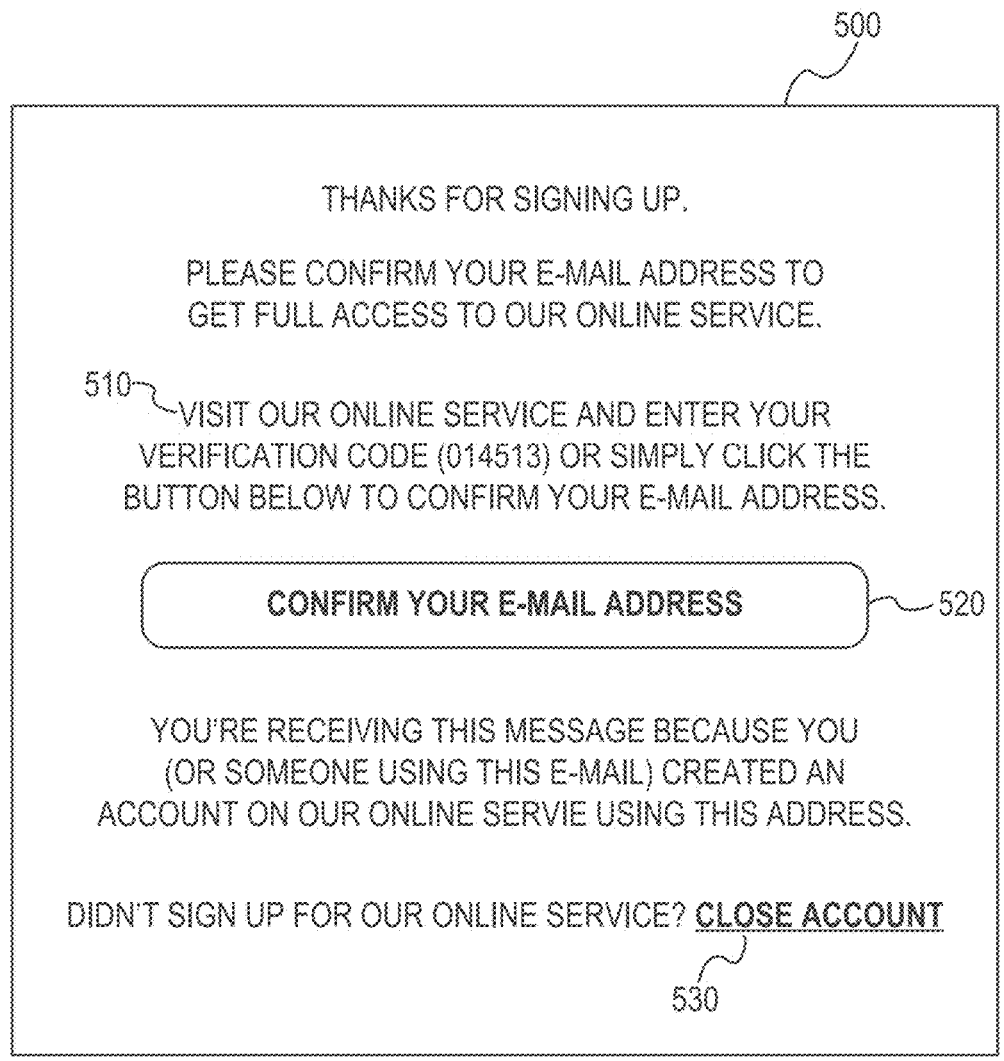
FIG. 5 illustrates a GUI in which a user can submit a confirmation of an e-mail address, in accordance with an example embodiment.

FIG. 5 illustrates a GUI 500 comprising a confirmation request message in which a user can submit a confirmation of an e-mail address, in accordance with an example embodiment. In some example embodiments, the confirmation request message of GUI 500 comprises one or more instructions 510 to the user on how to confirm the e-mail address in order to obtain full access to the services of the online service. For example, the confirmation request message of GUI 500 may comprise instructions to either visit the online service and enter a specific verification code (e.g., "014513" in FIG. 5) or select a selectable user interface element, such as selectable user interface element 520, displayed in the confirmation request message and configured to trigger a transmission of a confirmation of the e-mail address to the communication module 320. The confirmation request message of GUI 500 may also comprise a selectable user interface element 530 (e.g., selectable text "CLOSE ACCOUNT" in FIG. 5) configured to trigger a transmission, to the communication module 320, of an indication that the recipient of the confirmation request message did not submit the request to generate the digital representation.

In some example embodiments, the communication module 320 is configured to cause a display, on a computing device of the user, of a selectable option to request that a function of the online service be performed. For example, in some example embodiments, the selectable option comprises a selectable option to send a user-to-user message (e.g., a message that is requested by one user to another user) to one or more other users via the online service. This selectable option may be displayed on the computing device of the user subsequent to the communication module 320 transmitting the confirmation request message to the user, but before the communication module 320 receives a confirmation of the e-mail address from the user.

In some example embodiments, the one or more selectable options comprise one or more selectable options to send invitations to connect to other users of a social networking service. The communication module 320 may cause these selectable options to be displayed to the user as part of a "People You May Know" feature during an onboarding process of social networking service. The "People You May Know" feature may show the user connection suggestion based on determined commonalities between the user and the other users (e.g., common connections, similar profile information and experiences, working at the same company or in the same industry, attended the same school) or on contacts of the user that have been imported from the user's e-mail and mobile address books.

Figure 6:
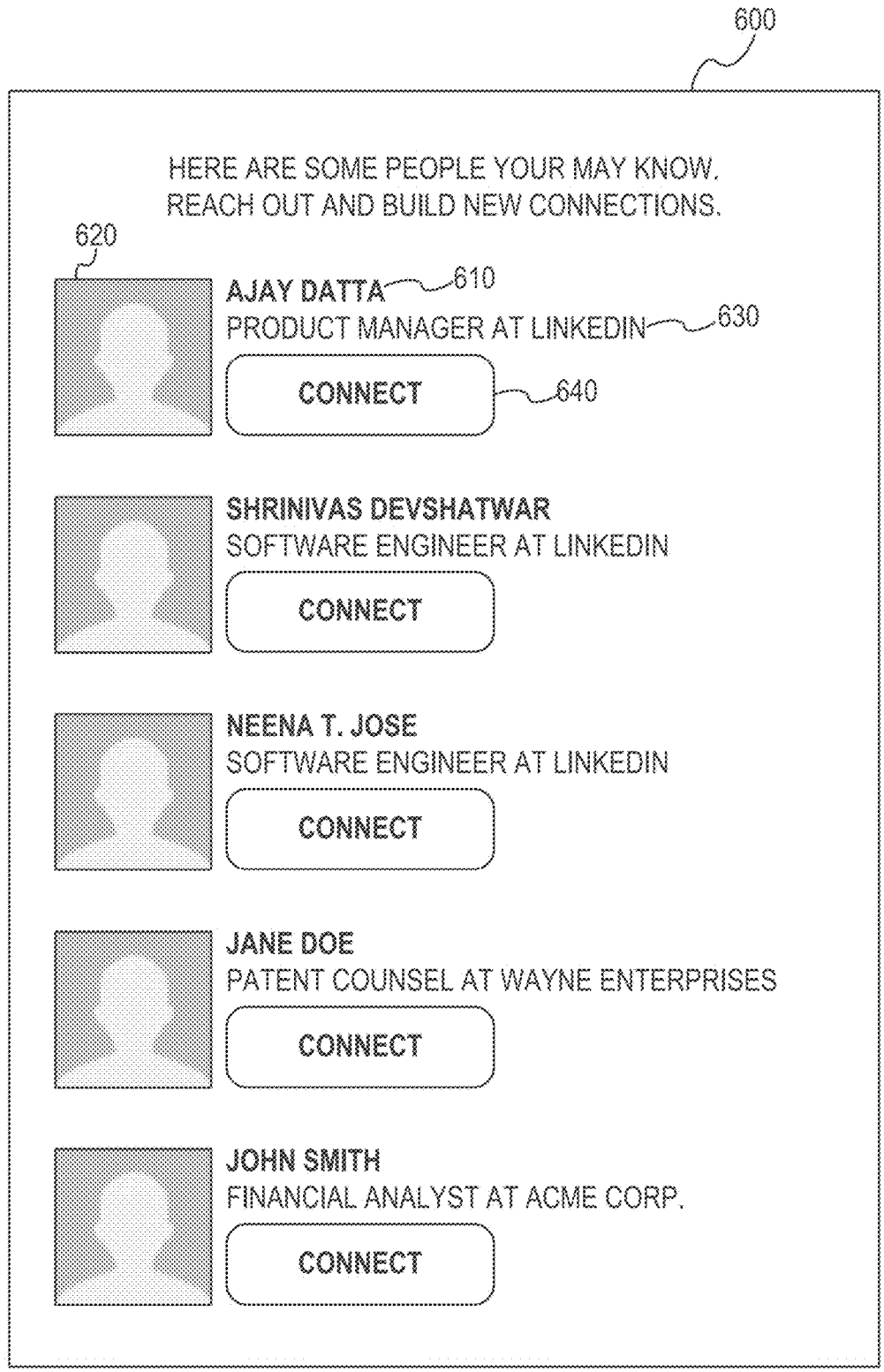
FIG. 6 illustrates a GUI in which a user can select an option to send a user-to-user message to one or more other users, in accordance with an example embodiment.

FIG. 6 illustrates a GUI 600 in which a user can select an option to send a user-to-user message to one or more other users, in accordance with an example embodiment. In FIG. 6, the GUI 600 displays selectable options to send invitations to other users of a social networking service to become connections on the social networking service. Each selectable option may comprise an identification 610 of the other user, an image 620 associated with a profile of the other user, one or more attributes 630 of the other user (e.g., job position, company), and a selectable user interface element 640 (e.g., a clickable button) configured to cause a user-to-user message (e.g., an invitation to connect) to be transmitted to the other user.

The communication module 320 may receive, from a computing device of the user, a selection of the option to send the user-to-user message to the other user(s) before the communication module 320 receives a confirmation of the e-mail address from the user. In some example embodiments, the communication module 320 is configured to determine whether or not a confirmation of the e-mail address has been received from the user, and prevent a transmission of the requested user-to-user message to the other user(s) based on a determination that the confirmation of the e-mail address has not been received. In some example embodiments, the communication module 320 is configured to store an indication of the user's selection of the option to send the user-to-user message to the other user(s) in a data storage device in response to, or otherwise based on, the determination that the confirmation of the e-mail address has not been received. In some example embodiments, the communication module 320 is configured to store the indication(s) in a cache until the communication module 320 receives a confirmation of the e-mail address from the user, and then transmit the requested user-to-user message to the other user(s) via the online service in response to, or otherwise based on, the confirmation of the e-mail address being received by the communication module 320. By presenting the user with the option of sending the user-to-user message to another user prior to the receiving confirmation of the e-mail address, yet delaying the transmission of the user-to-user message to the other user until the confirmation of the e-mail address is received, the communication module 320 solves the technical problem of providing functionality of the online service to the user without sacrificing the security of the computer system of the online service.

FIG. 7 illustrates a table 700 of indications of selections, by a user, of an option to send a user-to-user message to other users, which may be stored in a data storage (e.g., a cache) of the online service based on a confirmation of an e-mail address not being received, in accordance with an example embodiment. As seen in FIG. 7, each indication may comprise data that can be used to generate the corresponding user-to-user message, such as an identification of the user that is requesting that the user-to-user message be sent ("SENDER"), an identification of the other user to whom the user-to-user message is to be sent ("RECIPIENT"), a classification of the type of message that is being requested to be sent (e.g., an invitation to connect), and content that is to be included in the message that is being requested to be sent, which may include content that will be automatically included in the message based on the message type or content that is entered by the user requesting that the message be sent or a combination of both.

In some example embodiments, in response to, or otherwise based on, the communication module 320 receiving a confirmation of the e-mail address, the communication module 320 accesses each indication stored in the data storage, generates a user-to-user message based on the accessed indication, and transmits the generated user-to-user message to the other user corresponding to the indication. In some example embodiments, the communication module 320 generates the user-to-user message piecing together a combination of the data stored in the data storage (e.g., SENDER, RECIPIENT, MESSAGE TYPE, MESSAGE CONTENT). However, it is contemplated that the communication module 320 may alternatively store a generated user-to-user message as the indication in the data storage.

Figure 8:
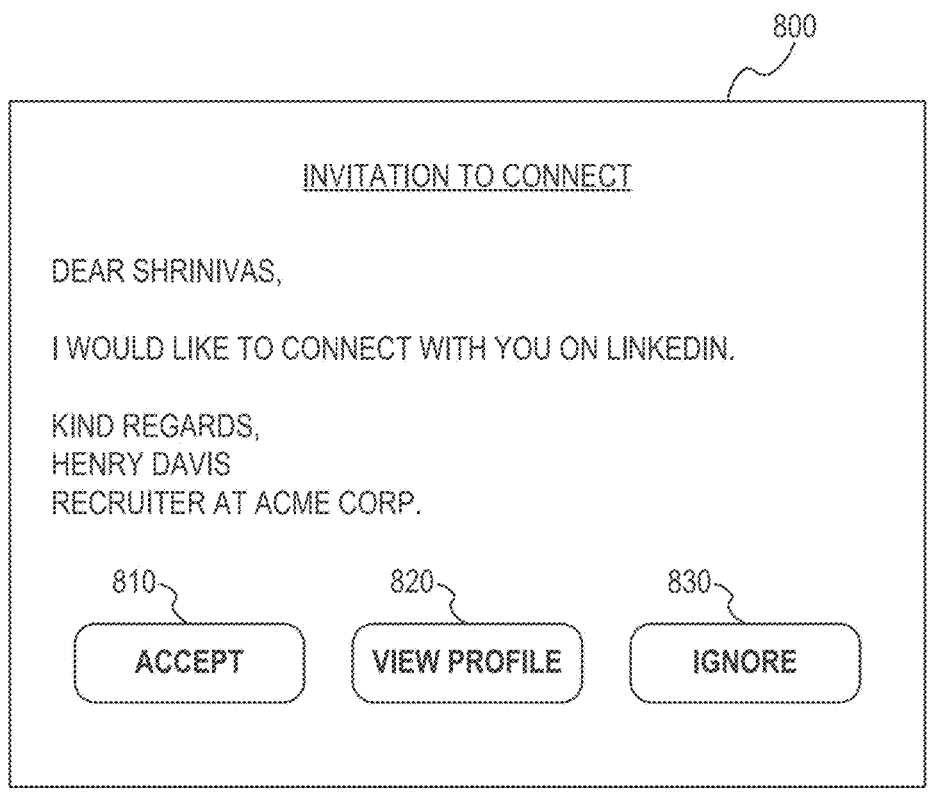
FIG. 8 illustrates a GUI in which an invitation to connect with a user on a social networking service is displayed to another user, in accordance with an example embodiment.

FIG. 8 illustrates a GUI 800 in which an invitation to connect with a user on a social networking service is displayed to another user, in accordance with an example embodiment. In some example embodiments, the communication module 320 transmits this invitation to the other user in response to, or otherwise based on, a determination by the communication module 320 that a confirmation of the e-mail address has been received. As seen in FIG. 8, the invitation to connect may comprise an explanation that the other user is being invited by a particular user to connect on the social networking service, along with a selectable user interface element 810 (e.g., an "ACCEPT" button) for accepting the invitation to connect, which is configured to cause the social networking service to generate and store a connection between the user and the other user in response to, or otherwise based on, the selection of the selectable user interface element 810. The invitation may also comprise a selectable user interface element 820 (e.g., a "VIEW PRO- FILE" button) configured to cause a profile of the user who sent the invention to be displayed to the other user in response to, or otherwise based on, its selection, as well as a selectable user interface element 830 (e.g., an "IGNORE" button) configured to decline or reject the invitation to connect in response to, or otherwise based on, its selection.

In some example embodiments, in order to avoid a waste of memory space and out-of-date user-to-text messages being transmitted to other user, the communication module 320 is configured to purge the data storage of indications after a predetermined amount of time. The predetermined amount of time may comprises a predetermined amount of time after the communication module 320 has transmitted the confirmation request message to the user, a predetermined amount of time after the communication module 320 has received the selection of the option to send the user-to-user message corresponding to the indication to be purged, or a predetermined amount of time after the indication is stored in the data storage.

As an additional layer of security, in some example embodiments, the communication nodule 320 is configured to delete all of the indications that are based on selections by a user from the data storage based on the communication module 320 receiving a request to reset the password from the user, such part of a "forgot password" procedure being performed for the account or profile of the user.

Figure 9:
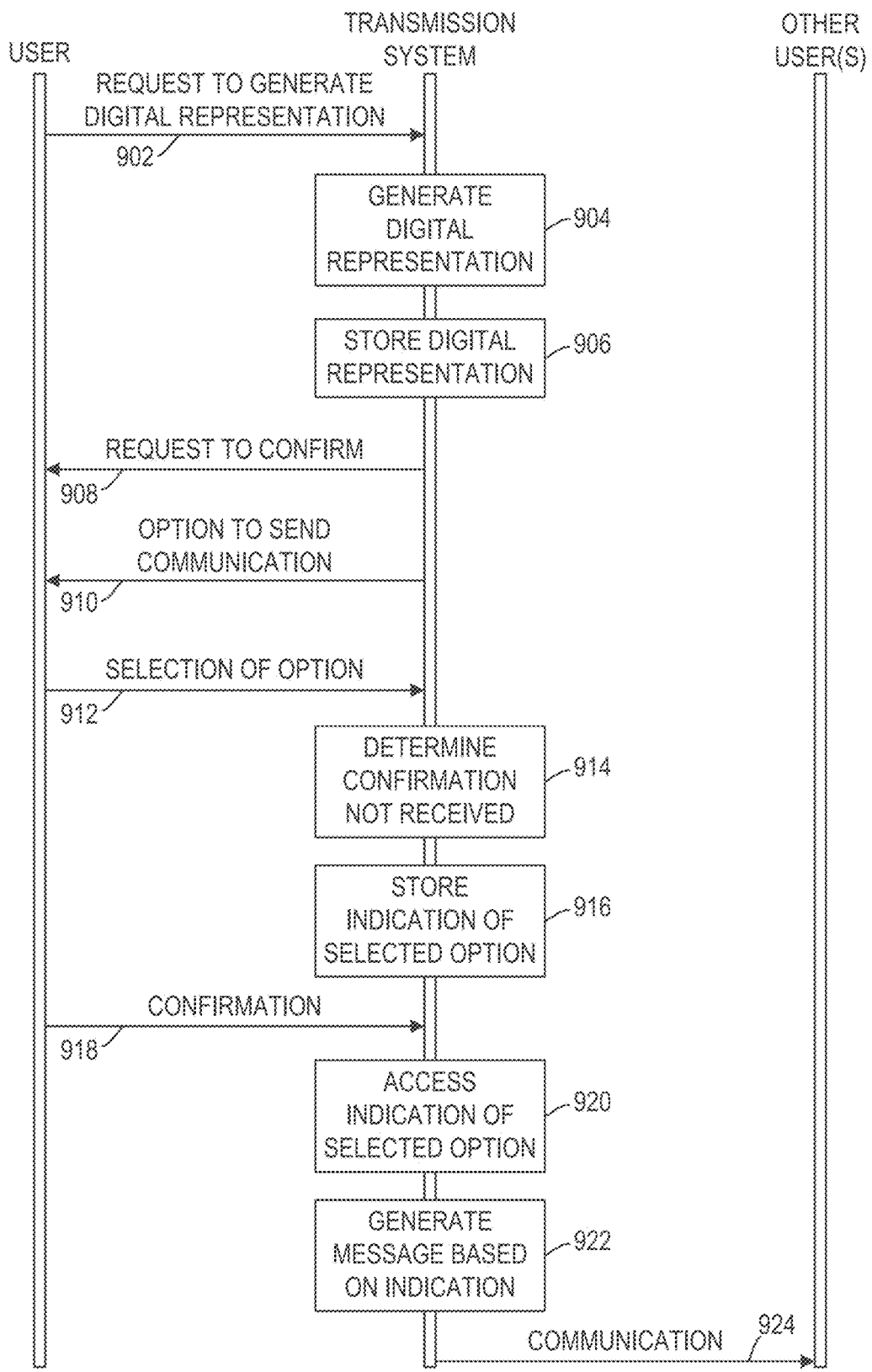
FIG. 9 is a sequence diagram for a method of ensuring verification before transmission of electronic messages, in accordance with an example embodiment.

FIG. 9 is a sequence diagram for a method of ensuring verification before transmission of electronic messages, in accordance with an example embodiment. The sequence diagram comprises operations being performed between a user (e.g., a computing device of a user), the transmission system 216, and one or more other users (e.g., computing device(s) of the other user(s)).

At operation 902, the user transmits a request to generate a digital representation of the user's identity on an online service to the transmission system 216. At operation 904, in response to, or otherwise based on, the user's request to generate the digital representation, the transmission system 216 generates the digital representation of the user's identity. At operation 906, the transmission system 216 stores the digital representation on a database of the online service. At operation 908, in response to, or otherwise based on the digital representation of the user's identity being generated and stored, the transmission system 216 transmits a confirmation request message to an e-mail address stored in association with the digital representation of the user, where the confirmation request message comprises a request for the first user to confirm the e-mail address. At operation 910, subsequent to transmitting the confirmation request message, the transmission system 216 causes a selectable option to send a user-to-user message to the other user(s) via the online service to be displayed on the computing device of the user before the transmission system 216 receives a confirmation of the e-mail address from the user. At operation 912, the user submits, to the transmission system 216, a selection of the option to send the user-to-user message to the other user(s). At operation 914, the transmission system 216 determines that the confirmation of the e-mail address has not been received. At operation 916 in response to, or otherwise based on, the transmission system 216 receiving the selection of the option to send the user-to-user message to the other user(s) and the determination that the confirmation of the e-mail address has not yet been received, the transmission system 216 prevents a transmission of the user-to-user message to the other user(s), and stores an indication of each selection of the option to send the user-to-user message to the other user(s) in a data storage. At operation 918, the user submits the confirmation of the e-mail address to the transmission system 216. In response to, or otherwise based on, receiving the confirmation of the e-mail address, the transmission system 216 transmits the user-to-user message to the other user(s) via the online service by accessing the indication(s) stored in the data storage, at operation 920, generating the user-to-user message(s) based on the accessed indication(s), at operation 922, and transmitting the generated user-to-user message(s) to the other user(s), at operation 924.

It is contemplated that any of the other features described within the present disclosure can be incorporated into the operation of the sequence diagram of FIG. 9.

Figure 10:
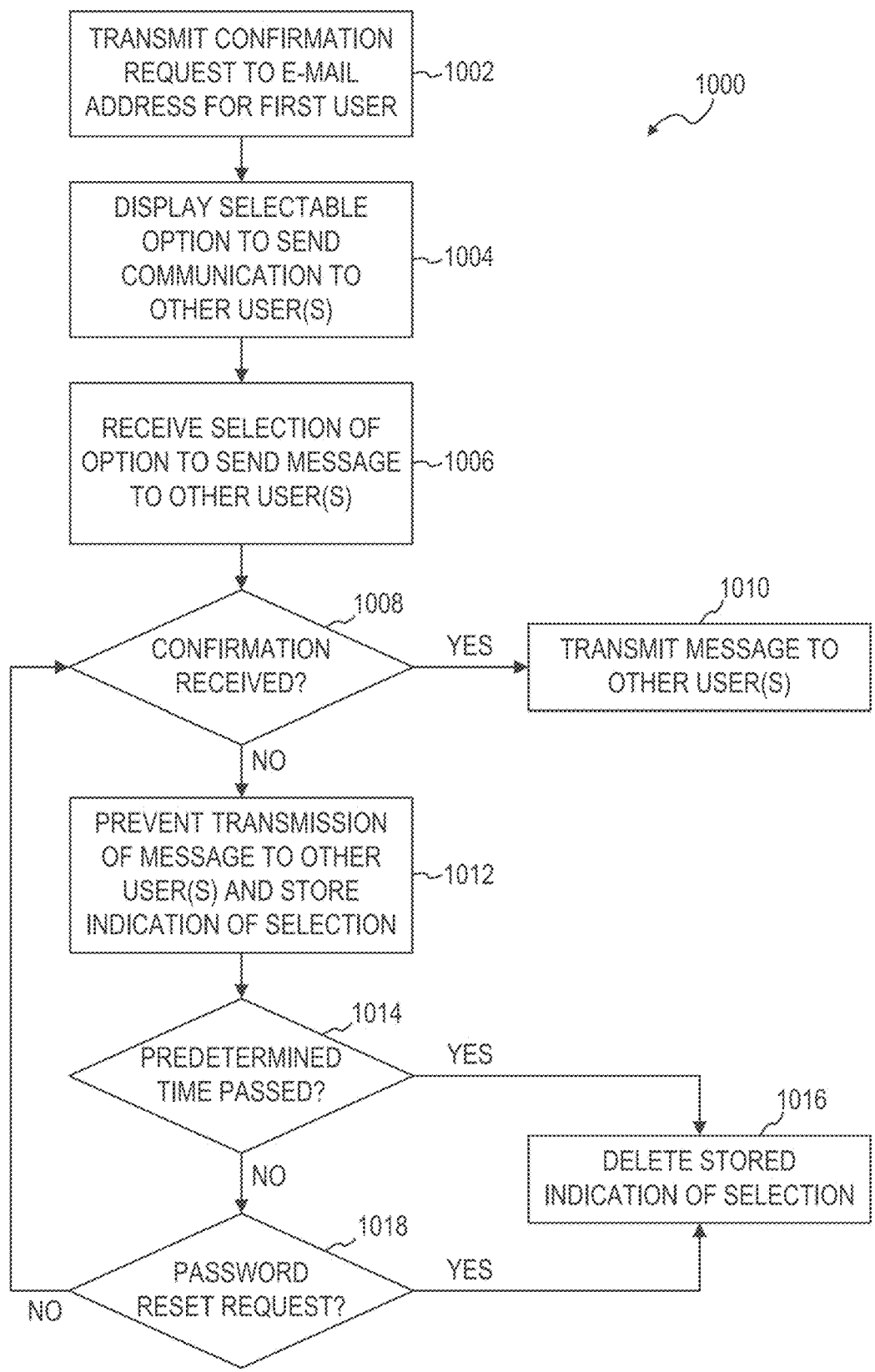
FIG. 10 is a flowchart illustrating a method of ensuring verification before transmission of electronic messages, in accordance with an example embodiment.

FIG. 10 is a flowchart illustrating a method 1000 of ensuring verification before transmission of electronic messages, in accordance with an example embodiment. Method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the transmission system 216 of FIGS. 2-3, or any combination of one or more of its modules, as described above.

At operation 1002, the transmission system 216 transmits a confirmation request message to an e-mail address stored in a database of an online service in association with a digital representation of a user. In some example embodiments, the confirmation request message comprises a request for the user to confirm the e-mail address. At operation 1004, the transmission system 216 causes a selectable option to send a user-to-user message to one or more other users via the online service to be displayed on the computing device(s) of the other user(s). In some example embodiments, operation 1004 is performed subsequent to the transmission system 216 transmitting the confirmation request message to the user, but before receiving a confirmation of the e-mail address from the user. At operation 1006, the transmission system 216 receives, from the computing device of the user, a selection of the option to send the user-to-user message to the other user(s).

At operation 1008, the transmission system 216 determines whether or not the confirmation of the e-mail address has been received from the user. If the transmission system 216 determines that the confirmation of the e-mail address has been received from the user, then the transmission system 216 transmits the user-to-user message to the other user(s) at operation 1010. If the transmission system 216 determines that the confirmation of the e-mail address has not been received from the user, then the transmission system 216 prevents a transmission of the user-to-user message to the other user(s) and stores an indication of each selection of the option to send the user-to-user message to the other user(s) in a data storage of the online service at operation 1012. In some example embodiments, each indication that is stored in the data storage comprises an identification of the corresponding other user.

At operation 1014, the transmission system 216 determines whether or not a predetermined amount of time has passed. In some example embodiments, the predetermined amount of time comprises one of a predetermined amount of time after the transmission system 216 has transmitted the confirmation request message to the user, a predetermined amount of time after the transmission system 216 has received the selection of the option to send the user-to-user message corresponding to the indication to be purged, and a predetermined amount of time after the indication is stored in the data storage of the online service. If the transmission system 216 determines that the predetermined amount of time has passed, then the transmission system 216 proceeds to operation 1016, where it deletes any indications from the data storage that correspond to the selection of the option by the user that were received at operation 1006. If the transmission system 216 determines that the predetermined amount of time has not passed, then the transmission system 216 proceeds to operation 1018, where the transmission system 216 determines whether or not a request to reset a password stored in association with the digital representation of the user has been received. If the transmission system 216 determines that a request to reset the password has been received, then the transmission system 216 proceeds to operation 1016, where it deletes any indications from the data storage that correspond to the selection of the option by the user that were received at operation 1006. If the transmission system 216 determines that a request to reset the password has not been received, then the transmission system 216 continues to determine if a confirmation of the e-mail address has been received at operation 1008.

It is contemplated that any of the other features described within the present disclosure can be incorporated into method 1000.

Although the examples disclosed herein refer to the use of an e-mail address and the confirmation of an e-mail address, in some example embodiments, the features and operations of the present disclosure are additionally or alternatively applied to other types of contact information, including, but not limited to a destination for receiving text messages (e.g., a cell phone number).

Example Mobile Device

Figure 11:
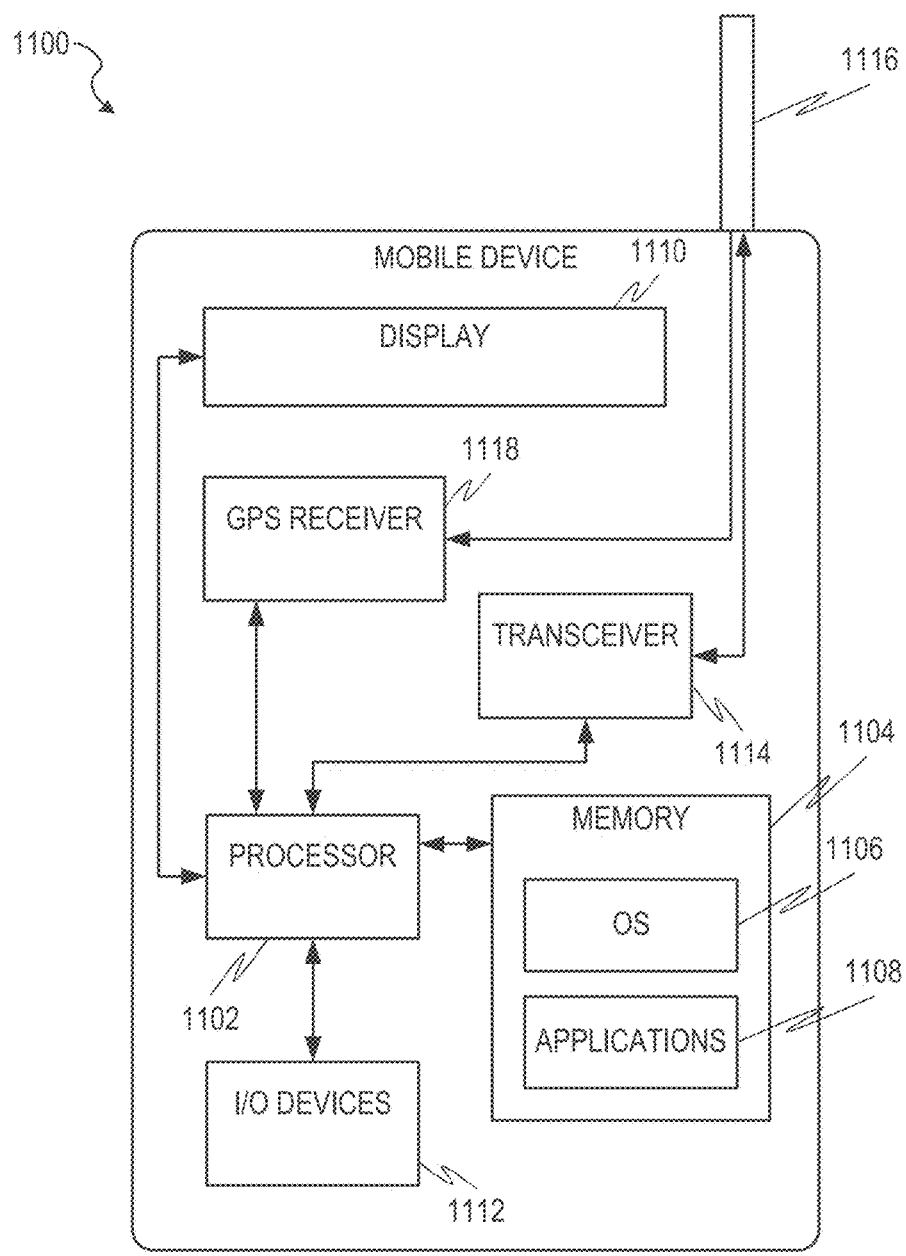
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations ma be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
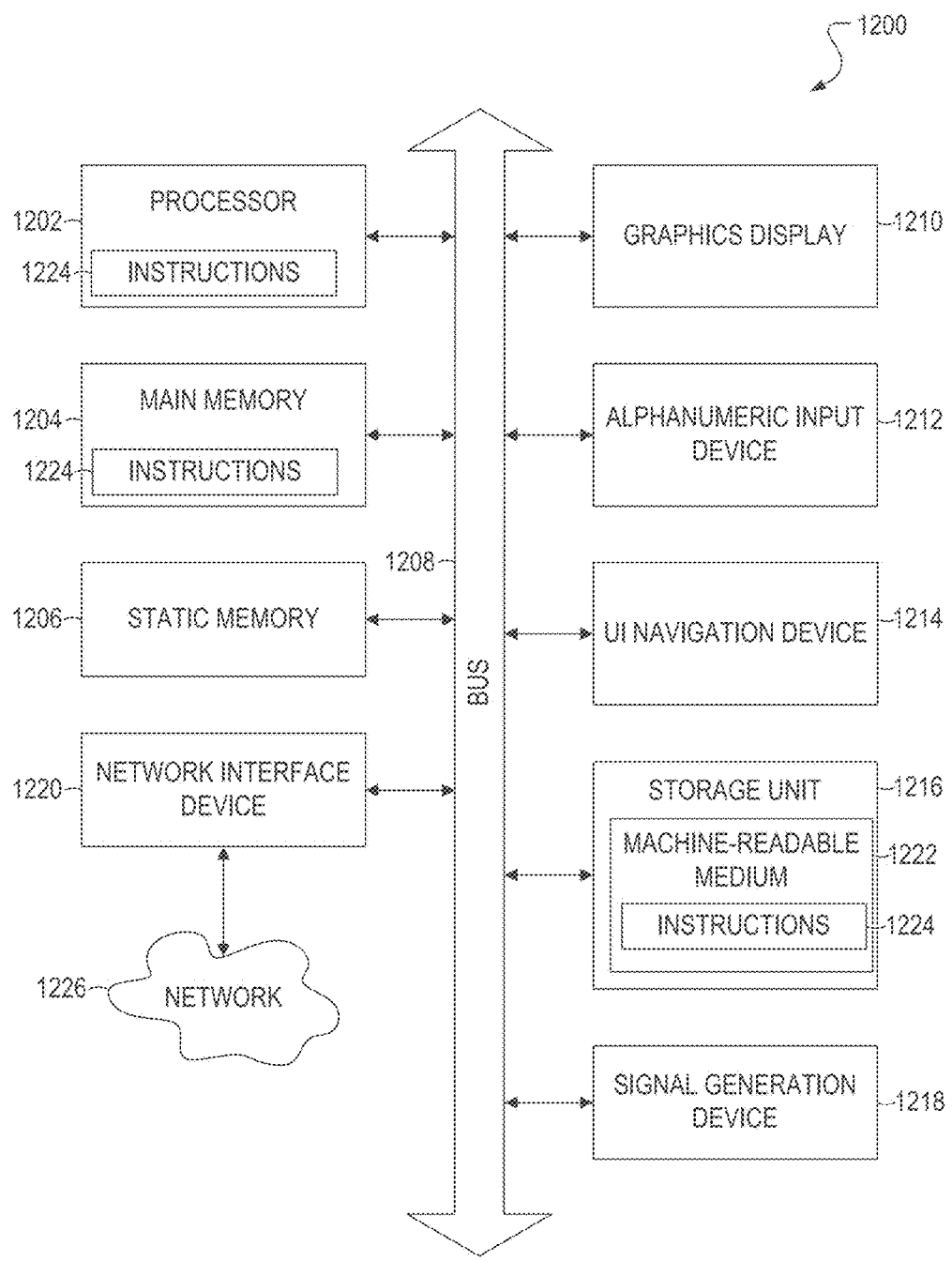
FIG. 12 is a block diagram of an example computer system on which methodologies described herein may be executed, in accordance with an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (110 navigation device 1214 a mouse), a storage unit 1216, a signal generation device 1218 (e.g., a speaker) and a network interface device 1220.

Machine-Readable Medium

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions (e.g., instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.
Transmission Medium The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving, by a computer system having at least one hardware processor, a request, from a computing device of a first user, to generate a digital representation of the first user's identity on an online service;
   generating, by the computer system, the digital representation of the first user's identity based on the request to generate the digital representation;
   storing, by the computer system, the digital representation on a database of the online service;
   transmitting, by the computer system, a confirmation request message to an e-mail address stored in association with the digital representation of the first user, the confirmation request message comprising a request for the first user to confirm the e-mail address;
   subsequent to transmitting the confirmation request message, causing, by the computer system, a selectable option to send a user-to-user message to a second user via the online service to be displayed on the computing device of the first user before receiving a confirmation of the e-mail address from the first user;
   receiving, by the computer system from the computing device of the first user, a selection of the option to send the user-to-user message to the second user;
   determining, by the computer system, that the confirmation of the e-mail address has not been received; and
   preventing, by the computer system, a transmission of the user-to-user message to the second user based on the determining that the confirmation of the e-mail address has not been received, the preventing comprising goring an indication of the selection of the option to send the user-to-user message to the second user in a data storage.

2. The computer-implemented method of claim 1, wherein the indication comprises an identification of the second user.

3. The computer-implemented method of claim 1, further comprising receiving the confirmation of the e-mail address from the first user.

4. The computer-implemented method of claim 3, further comprising transmitting the user-to-user message to the second user via the online service based on the receiving the confirmation of the e-mail address.

5. The computer-implemented method of claim 4, wherein the transmitting the user-to-user message to the second user comprises:
   accessing the indication stored in the data storage; and
   generating the user-to-user message based on the accessed indication.

6. The computer-implemented method of claim 4, wherein the transmitting of the user-to-user message to the second user via the online service is further based on the confirmation of the e-mail address being received within a predetermined time period.

7. The computer-implemented method of claim 6, wherein the predetermined time period comprises a predetermined amount of time after receiving the selection of the option to send the user-to-user message to the second user.

8. The computer-implemented method of claim 1, further comprising:
   determining that a predetermined amount of time has passed; and
   deleting the indication from the data storage based on the determining that the predetermined amount of time has passed.

9. The computer-implemented method of claim 8, wherein the predetermined time period comprises a predetermined amount of time after receiving the selection of the option to send the user-to-user message to the second user.

10. The computer-implemented method of claim 1, further comprising:
    receiving a request to reset a password stored in association with the digital representation; and
    deleting the indication from the data storage based on the receiving the request to reset the password.

11. The computer-implemented method of claim 1, wherein the user-to-user message to the second user comprises an invitation to connect with the first user via the online service.

12. The computer-implemented method of claim 1, wherein the online service comprises a social networking service.

13. A system comprising:
    at least one hardware processor; and
    a non-transitory machine-readable medium embodying a set of instructions that, when executed by the at least one hardware processor, cause the at least one processor to perform operations, the operations comprising:

receiving a request, from a computing device of a first user, to generate a digital representation of the first user's identity on an online service;

generating the digital representation of the first user's identity based on the request to generate the digital representation;

storing the digital representation on a database of the online service;

transmitting a confirmation request message to an e-mail address stored in association with the digital representation of the first user, the confirmation request message comprising a request for the first user to confirm the e-mail address;

subsequent to transmitting the confirmation request message, causing a selectable option to send a user-to-user message to a second user via the online service to be displayed on the computing device of the first user before receiving a confirmation of the e-mail address from the first user;

receiving, from the computing device of the first user, a selection of the option to send the user-to-user message to the second user;

determining that the confirmation of the e-mail address has not been received; and preventing a transmission of the user-to-user message to the second user based on the determining that the confirmation of the e-mail address has not been received.

14. The system of claim 13, wherein the preventing comprising storing an indication of the selection of the option to send the user-to-user message to the second user in a data storage.

15. The system of claim 14, wherein the operations further comprise receiving the confirmation of the e-mail address from the first user.

16. The system of claim 15, wherein the operations further comprise transmitting the user-to-user message to the second user via the online service based on the receiving the confirmation of the e-mail address.

17. The system of claim 16, wherein the transmitting the user-to-user message to the second user comprises:

accessing the indication stored in the data storage; and
generating the user-to-user message based on the accessed indication.

18. The system of claim 16, wherein the transmitting of the user-to-user message to the second user via the online service is further based on the confirmation of the e-mail address being received within a predetermined time period.

19. The system of claim 18, wherein the predetermined time period comprises a predetermined amount of time after receiving the selection of the option to send the user-to-user message to the second user.

20. A non-transitory machine-readable medium embodying a set of instructions that, when executed by at least one hardware processor, cause the processor to perform operations, the operations comprising:

generating, for an online service, a digital representation of a first user's identity based on a request received from a computing device;

transmitting a confirmation request message using contact information received from the computing device in association with creating the digital representation of the first user's identity, the confirmation request message requesting action to confirm information associated with creating the digital representation;

causing a selectable option to send a user-to-user message to a second user via the online service to he displayed on the computing device before the requested action is performed;

receiving, from the computing device, a selection of the option to send the user-to-user message to the second user;

determining that the requested action has not been performed;

preventing a transmission of the user-to-user message to the second user based on the determining that the requested action has not been performed;

storing, in a data storage, an indication of the selection of the option to send the user-to-user message to the second user; and responsive to the requested action being performed, transmitting the user-to-user message to the second user based on the stored indication.

\* \* \* \* \*

UNITED STATES PATENT AND TRADEMARK OFFICE
CERTIFICATE OF CORRECTION

PATENT NO. : 10,447,704 B2
APPLICATION NO. : 15/793131
DATED : October 15, 2019
INVENTOR(S) : Datta et al.

Page 1 of 1

It is certified that error appears in the above-identified patent and that said Letters Patent is hereby corrected as shown below:

In the Claims

In Column 18, Lines 11-12, in Claim 1, delete "goring" and insert --storing-- therefor In Column 20, Line 26, in Claim 20, delete "he" and insert --be-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*